(12) United States Patent  
Feldman

(10) Patent No.: US 12,445,436 B2
(45) Date of Patent: Oct. 14, 2025

(54) CONFIGURING OFFLINE ELECTRIC VEHICLE SUPPLY EQUIPMENT (EVSE) VIA 2-FACTOR AUTHENTICATION

(71) Applicant: Siemens Industry, Inc., Alpharetta, GA (US)

(72) Inventor: Daniel Feldman, New York, NY (US)

(73) Assignee: Siemens Industry, Inc., Alpharetta, GA (US)

( * ) Notice: Subject to any disclaimer, the term of this patent is extended or adjusted under 35 U.S.C. 154(b) by 348 days.

(21) Appl. No.: 18/151,299

(22) Filed: Jan. 6, 2023

(65) Prior Publication Data

US 2024/0236083 A1 Jul. 11, 2024

(51) Int. Cl.
  *H04L 9/40* (2022.01)
(52) U.S. Cl.
  CPC ...... *H04L 63/0853* (2013.01); *H04L 63/0876* (2013.01)
(58) Field of Classification Search
  CPC .......... H04L 63/0853; H04L 63/0876
  USPC ........................................... 726/2
  See application file for complete search history.

(56) References Cited

U.S. PATENT DOCUMENTS 11,173,802 B2   11/2021   Heuer
2022/0134898 A1  5/2022   Bode

FOREIGN PATENT DOCUMENTS

WO   WO-2021229543 A2 * 11/2021 ............... G07F 9/10
WO        2022056590 A1    3/2022
WO   WO-2022241267 A1 * 11/2022 .............. B60L 53/67

\* cited by examiner

*Primary Examiner* — Lan Dai T Truong

(57) ABSTRACT

Systems and methods for 2-factor authentication of an offline Electric Vehicle Supply Equipment (EVSE) are provided. One system comprises a data input apparatus for entering a qualifying identification of an installer and for entering an authorizing signal by the installer to login into an application that shows the EVSE that the installer is authorized to configure the EVSE. The login to initiate a power cycle of the EVSE which is a first-factor authentication and puts the EVSE in a configuration mode. The system further comprises an authorization computer connected to the data input apparatus for establishing an authorization signal and for verifying a received authorization signal for a user to connect the EVSE to Internet which puts the EVSE in a connected mode. The user rights of the user are checked as a second-factor authentication by a Charger configuration tool or a charger application or a configuration software.

16 Claims, 4 Drawing Sheets

CONFIGURING OFFLINE ELECTRIC VEHICLE SUPPLY EQUIPMENT (EVSE) VIA 2-FACTOR AUTHENTICATION

BACKGROUND

1. Field

Aspects of the present invention generally relate to authorizing access to an offline Electric Vehicle Supply Equipment (EVSE) via 2-factor authentication for an EVSE configuration.

2. Description of the Related Art

Unlike gas-powered vehicles, electric vehicles (EVs) do not require internal combustion engines to operate. Outfitted with an electric motor and a rechargeable battery pack, EVs move along our roadways without burning up gasoline, or producing harmful exhaust emissions, while generating less noise pollution. The world of transportation continues to rapidly evolve. Sales of electric vehicles (EVs) are expected to expand rapidly in the US in the coming years. Economics aside, there are growing social and political initiatives toward "clean" energy that will push this to become reality. A number of market forecasts indicate electric vehicles will account for nearly 1 in 5 of all vehicles sold within the next 10 years. It is estimated approximately 3 million EVs will be sold in the US in 2028. A rule of thumb by industry analysts is there need be on the order of 20 public EVC stations per EV on the road to support the ecosystem. There were just over 60,000 charging stations in the US at the end of 2019. Thus, tens of thousands will need to be deployed every year for some time as the market grows.

Charging stations have provided hundreds of millions of charges to EV (electric vehicle) drivers worldwide. When it comes to electric vehicles, the converter is built inside the car. It's called the "onboard charger" though it really is a converter. It converts power from AC to DC and then feeds it into the car's battery. This is the most common charging method for electric vehicles today and most chargers use AC power.

An EV is connected to AC power, 120V or 240V, and a battery charger in the EV converts the AC power to the DC needed to charge the battery and controls the charging process. In DCFC the DCFC converts the AC power to DC and the DC power is sent directly to the EV battery bypassing the onboard battery charger. There are three categories or types of charging: Trickle Charge, AC Charge and DC Charge. Most drivers of electric vehicles (EVs)—which include all-electric vehicles and plug-in hybrid electric vehicles (PHEVs)—charge their vehicles overnight at home using AC Level 1 or AC Level 2 charging equipment.

A charging station, also known as a charge point or electric vehicle supply equipment (EVSE), is a piece of equipment that supplies electrical power for charging plug-in electric vehicles (including electric cars, electric trucks, electric buses, neighborhood electric vehicles, and plug-in hybrids). There are two main types: AC charging stations and DC fast chargers. Batteries can only be charged with direct current (DC) electric power, while most electricity is delivered from the power grid as alternating current (AC). For this reason, most electric vehicles have an onboard charger with an AC-to-DC converter (a rectifier). At an AC charging station, power is supplied to the onboard charger.

When EVSEs have no network connectivity and are deployed in a location without network connectivity, it may not be possible for an installer to login into an application that shows the EVSE that person is authorized to configure the charger or when that is not enough to authenticate the person. There is no known method for 2-factor authentication for an EVSE configuration in locations without networking such as in a location without internet connectivity.

Therefore, there is a need for a system and a method to manage configuration of an offline EVSE.

SUMMARY

Briefly described, aspects of the present invention relate to configuring an offline Electric Vehicle Supply Equipment (EVSE) via 2-factor authentication. Techniques for configuring electric vehicle supply equipment (EVSE) are disclosed. The disclosed embodiments describe how to use a radio-frequency identification (RFID) card or a device Mac address to establish the 2-factor authentication in a location without internet connectivity. Two types of parameters are generally configured in one embodiment: networking information and functional and safety information which includes Open Charge Point Protocol (OCPP) server address, Cloud server address, Authentication mode (authenticated vs. free), RFID allow list, maximum current (future), Bluetooth allow list (future), etc. If the charger has connectivity to the internet, it should be possible to configure it using a charger Configuration Tool (a.k.a. PC Tool) or the charger app or some future admin configuration software, remotely, for any parameter (unless certain configuration parameters have to do with safety and can only be configured locally). It should (in the future), be possible to use one of the apps to remotely put the charger in a configuration mode without "removing it from the Cloud group". If the charger does not have connectivity to the internet, only local configuration is possible of the same parameters mentioned above. The question is: if the charger is offline, how can we be sure that the person configuring the charger is allowed to do so? A few options are possible:

(i). an offline charger, when power cycled, always puts itself in the configuration mode, allowing anyone to connect it to the internet. Once the charger is connected to the internet, it goes back to the connected mode such that user rights can be checked.

(ii). an offline charger, when power cycled, requires a tap by a Master RFID card in order to allow configuration. This Master RFID card is assigned to it during manufacturing and serves as a proof that the person configuring the charger is authorized to do so. The charger can default to not require this, and be configured by the app or PC tool to require this 2-factor authentication (the first factor being the power cycle itself).

(iii). an offline charger, when power cycled, requires the PC tool installed on a specific computer or the app installed on a specific phone (both identified by Wi-Fi or Bluetooth Mac address) as $2^{nd}$ factor of authentication.

(iv). an offline charger, when power cycled, requires both the Master RFID tap and a specific computer or app Mac address for configuration.

In accordance with one illustrative embodiment of the present invention, a system for authorizing access to an offline Electric Vehicle Supply Equipment (EVSE) via 2-factor authentication for an EVSE configuration is provided. The system comprises a data input apparatus for entering a qualifying identification of an installer and for entering an authorizing signal by the installer to login into an application that shows the EVSE that the installer is authorized to configure the EVSE. The login to initiate a power cycle of the EVSE in that the EVSE is to be rebooted. The power cycle in itself is a first-factor authentication. The power cycle puts the EVSE in a configuration mode. The system comprises an authorization computer connected through a first transmission path to the data input apparatus for establishing an authorization signal and for verifying a received authorization signal for a user to connect the EVSE to Internet which puts the EVSE in a connected mode. The user rights of the user are checked as a second-factor authentication by a charger configuration tool or a charger application (APP) or a configuration software.

In accordance with one illustrative embodiment of the present invention, a system for authorizing access to an offline Electric Vehicle Supply Equipment (EVSE) via 2-factor authentication for an EVSE configuration is provided. The system comprises a data input apparatus for entering a qualifying identification of an installer and for entering an authorizing signal by the installer to login into an application that shows the EVSE that the installer is authorized to configure the EVSE. The login to initiate a power cycle of the EVSE in that the EVSE is to be rebooted. The power cycle in itself is a first-factor authentication. The power cycle puts the EVSE in a configuration mode. The system comprises a Radio-frequency identification (RFID) reader to read a RFID code number from a master RFID card as a second-factor authentication in order to authorize configuration of the EVSE. The master RFID card is assigned to the EVSE during manufacturing and serves as a proof that the installer configuring the EVSE is authorized to do so.

In accordance with one illustrative embodiment of the present invention, a system for authorizing access to an offline Electric Vehicle Supply Equipment (EVSE) via 2-factor authentication for an EVSE configuration is provided. The system comprises a data input apparatus for entering a qualifying identification of an installer and for entering an authorizing signal by the installer to login into an application that shows the EVSE that the installer is authorized to configure the EVSE. The login to initiate a power cycle of the EVSE in that the EVSE is to be rebooted. The power cycle in itself is a first-factor authentication. The power cycle puts the EVSE in a configuration mode. The system comprises an authorization computer connected through a first transmission path to the data input apparatus. The authorization computer includes a charger configuration tool for configuration of the EVSE such that the authorization computer is identified by a Wi-Fi® device Mac address or a Bluetooth® device Mac address as a second-factor authentication. The system comprises a mobile device connected through a second transmission path to the data input apparatus. The authorization computer includes a charger application (APP) for configuration of the EVSE such that the mobile device is identified by a Wi-Fi® device Mac address or a Bluetooth® device Mac address as a second-factor authentication.

In accordance with one illustrative embodiment of the present invention, a system for authorizing access to an offline Electric Vehicle Supply Equipment (EVSE) via 2-factor authentication for an EVSE configuration is provided. The system comprises a data input apparatus for entering a qualifying identification of an installer and for entering an authorizing signal by the installer to login into an application that shows the EVSE that the installer is authorized to configure the EVSE. The login to initiate a power cycle of the EVSE in that the EVSE is to be rebooted. The power cycle in itself is a first-factor authentication. The power cycle puts the EVSE in a configuration mode. The system comprises a Radio-frequency identification (RFID) reader to read a RFID code number from a master RFID card as a second-factor authentication in order to authorize configuration of the EVSE. The master RFID card is assigned to the EVSE during manufacturing and serves as a proof that the installer configuring the EVSE is authorized to do so. The system comprises an authorization computer connected through a first transmission path to the data input apparatus. The authorization computer includes a charger configuration tool for configuration of the EVSE such that the authorization computer is identified by a Wi-Fi® device Mac address or a Bluetooth® device Mac address as the second-factor authentication. The system comprises a mobile device connected through a second transmission path to the data input apparatus. The authorization computer includes a charger application (APP) for configuration of the EVSE such that the mobile device is identified by a Wi-Fi® device Mac address or a Bluetooth® device Mac address as the second-factor authentication.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

DETAILED DESCRIPTION

Figure 1:
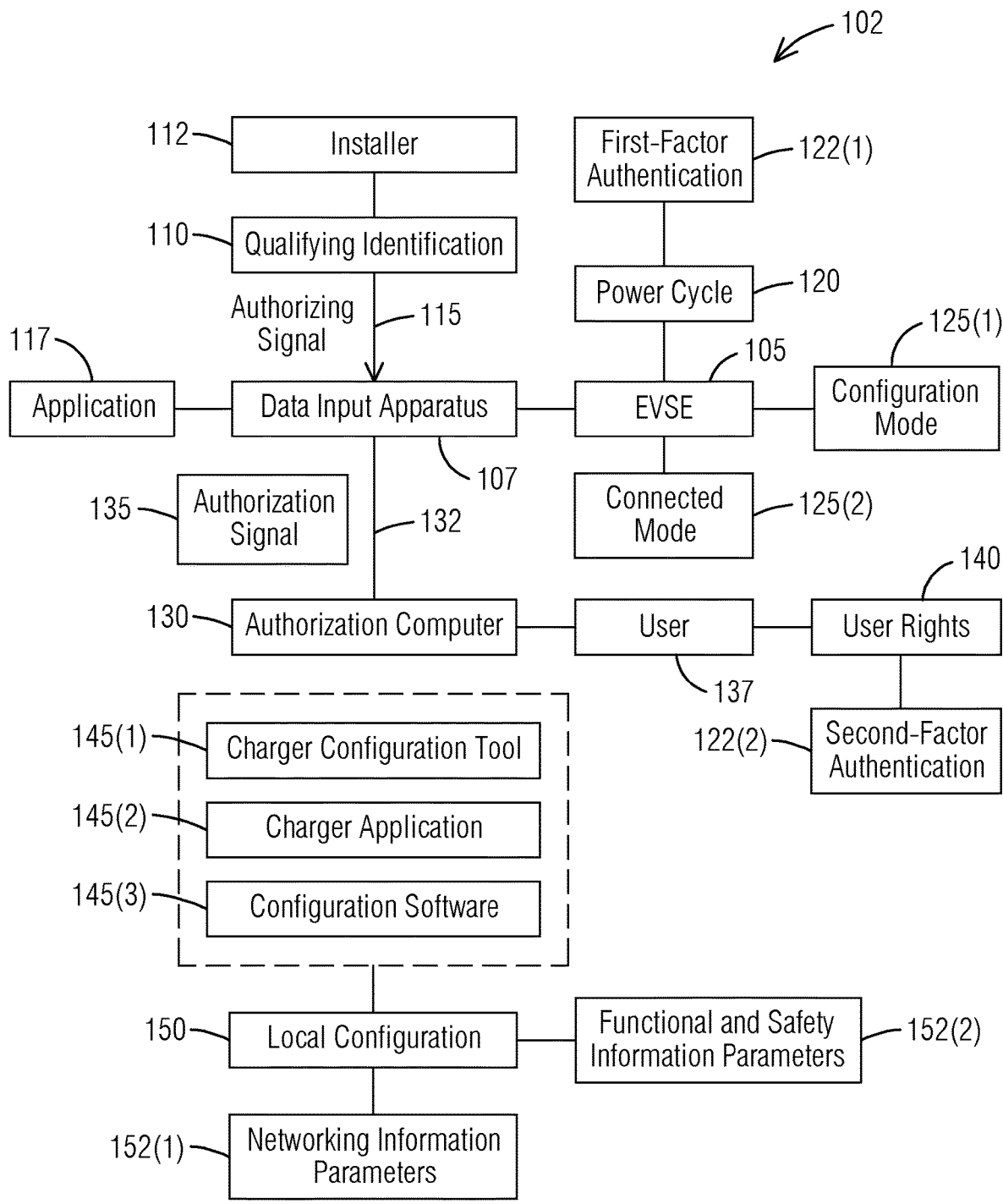
FIG. 1 illustrates a system for authorizing access to an offline Electric Vehicle Supply Equipment (EVSE) via 2-factor authentication for an EVSE configuration in accordance with a first embodiment of the present invention.

Various technologies that pertain to systems and methods that configure an EVSE such that it authorizes access to an offline Electric Vehicle Supply Equipment (EVSE) via 2-factor authentication are presented. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

To facilitate an understanding of embodiments, principles, and features of the present invention, they are explained hereinafter with reference to implementation in illustrative embodiments. In particular, they are described in the context of an EVSE configuration management system and a method that can configure an offline EVSE. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

These and other embodiments of the EVSE configuration management system according to the present disclosure are described below with reference to FIGS. 1-4 herein. Like reference numerals used in the drawings identify similar or identical elements throughout the several views. The drawings are not necessarily drawn to scale.

The term electric vehicle (EV), as used herein, refers to a motorized vehicle deriving locomotive power, either full-time or part-time, from an electric system on board the motorized vehicle. By way of non-limiting examples, an EV may be an electrically powered passenger vehicle for road use; an electric scooter; an electric fork lift; a cargo-carrying vehicle powered, full-time or part-time, by electricity; an off-road electrically powered vehicle; an electrically powered watercraft; etc.

The term electric vehicle supply equipment (EVSE), as used herein, refers to equipment by which an EV may be charged or recharged. An EVSE may comprise or be coupled to a computing system whereby service to the EV is provisioned, optionally, according to parameters. In some embodiments, values for the parameters are operator-selectable. Alternatively, or in addition, the values for the parameters may be automatically selected. An EVSE may comprise a means of providing cost accounting, and may further comprise a payment acceptance component. An EVSE may be installed at a home or residence of an owner/operator of an EV, at a place of business for an owner/operator of an EV, at a fleet facility for a fleet comprising one or more EVs, at a public charging station, etc. The present disclosure uses the terms EVSE and "charging station," where for purposes of this disclosure, an EVSE is an example of a charging station.

An EVSE may be portable such that it can be brought by a user to various locations and used to charge an EV. For example, a user may install and use an EVSE at home to charge an EV. The user may then travel to a friend or family member's home, bringing the EVSE, and install and use the EVSE to charge the EV at the friend or family member's home.

The EVSE can be installed by connecting a plug of the EVSE to an electrical outlet at the installation location. The EVSE may then be used to deliver electricity to an EV for charging. However, electrical conditions may vary based on the installation location, which may impact EVSE performance, and the EVSE may need to be configured at different installation locations. Configuring the EVSE may be time and/or labor intensive, but improper configuring can be detrimental. For example, a maximum current delivered by the EVSE may vary based on the electrical conditions where the EVSE is installed, so the EVSE may need to be configured to determine a correct maximum current. Otherwise, use of the EVSE having an improper configuration may cause an electrical fault, tripping a circuit breaker of the installation location and disrupting charging. Accordingly, embodiments of the present disclosure relate to techniques for determining an EVSE configuration at each location where an EVSE is installed.

Consistent with one embodiment of the present invention, FIG. 1 represents a system 102 for authorizing access to an offline Electric Vehicle Supply Equipment (EVSE) 105 via 2-factor authentication for an EVSE configuration in accordance with a first embodiment of the present invention. The EVSE 105 have no network connectivity and is deployed in a location without network connectivity. The system 102 comprises a data input apparatus 107 for entering a qualifying identification 110 of an installer 112 and for entering an authorizing signal 115 by the installer 112 to login into an application 117 that shows the EVSE 105 that the installer 112 is authorized to configure the EVSE 105. The login initiates a power cycle 120 of the EVSE 105 in that the EVSE 105 is to be rebooted. The power cycle 120 in itself is a first-factor authentication 122(1). The power cycle 120 puts the EVSE 105 in a configuration mode 125(1). It is not possible for the installer 112 to login into the application 117 that shows the EVSE 105 that a person is authorized to configure the EVSE 105 or when that is not enough to authenticate the person.

The system 102 further comprises an authorization computer 130 connected through a first transmission path 132 to the data input apparatus 107 for establishing an authorization signal 135 and for verifying a received authorization signal for a user 137 to connect the EVSE 105 to Internet which puts the EVSE 105 in a connected mode 125(2). User rights 140 of the user 137 are checked as a second-factor authentication 122(2) by a charger configuration tool 145(1) or a charger application (APP) 145(2) or a configuration software 145(3).

In the system 102, a local configuration 150 is possible of networking information parameters 152(1) and functional and safety information parameters 152(2) based on the 2-factor authentication of a person configuring the EVSE 105. The functional and safety information parameters 152(2) include: an Open Charge Point Protocol (OCPP) server address, a Cloud server address, an Authentication mode (authenticated vs free), a Radio-frequency identification (RFID) allow list, a maximum current (future), and a Bluetooth® allow list.

Figure 2:
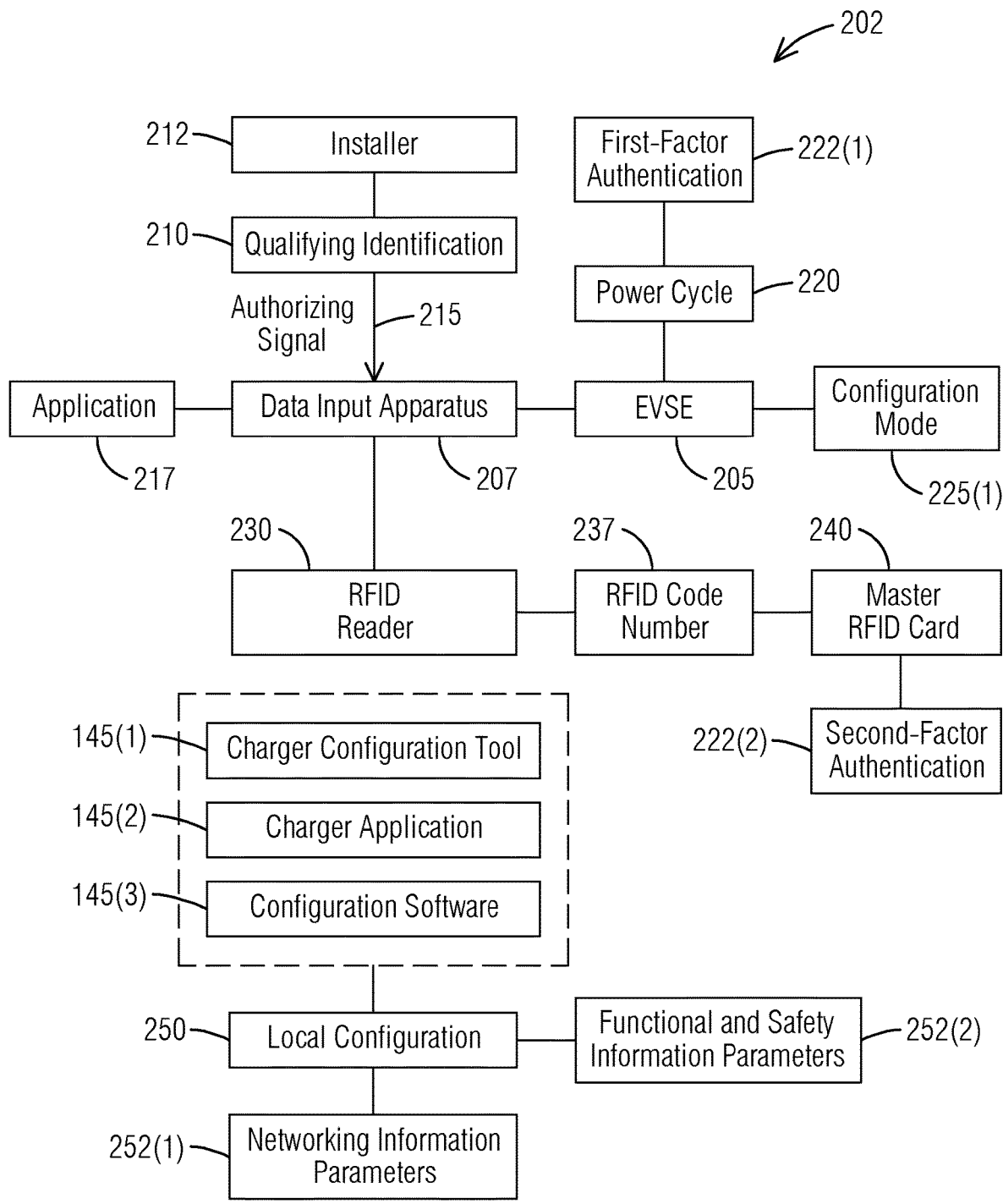
FIG. 2 illustrates a system for authorizing access to an offline Electric Vehicle Supply Equipment (EVSE) via 2-factor authentication for an EVSE configuration in accordance with a second embodiment of the present invention.

Referring to FIG. 2, it illustrates a system 202 for authorizing access to an offline Electric Vehicle Supply Equipment (EVSE) 205 via 2-factor authentication for an EVSE configuration in accordance with a second embodiment of the present invention. The EVSE 205 have no network connectivity and is deployed in a location without network connectivity. The system 202 comprises a data input apparatus 207 for entering a qualifying identification 210 of an installer 212 and for entering an authorizing signal 215 by the installer 212 to login into an application 217 that shows the EVSE 205 that the installer 212 is authorized to configure the EVSE 205. The login initiates a power cycle 220 of the EVSE 205 in that the EVSE 205 is to be rebooted. The power cycle 220 in itself is a first-factor authentication 222(1). The power cycle 220 puts the EVSE 205 in a configuration mode 225(1). It is not possible for the installer 212 to login into the application 217 that shows the EVSE

205 that a person is authorized to configure the EVSE 205 or when that is not enough to authenticate the person.

The system 202 further comprises a Radio-frequency identification (RFID) reader 230 to read a RFID code number 237 from a master RFID card 240 as a second-factor authentication 222(2) in order to authorize configuration of the EVSE 205. The master RFID card 240 is assigned to the EVSE 205 during manufacturing and serves as a proof that the installer 212 configuring the EVSE 205 is authorized to do so.

In the system 202, a local configuration 250 is possible of networking information parameters 252(1) and functional and safety information parameters 252(2) based on the 2-factor authentication of a person configuring the EVSE 205. The functional and safety information parameters 252(2) include: an Open Charge Point Protocol (OCPP) server address, a Cloud server address, an Authentication mode (authenticated vs free), a Radio-frequency identification (RFD) allow list, a maximum current (future), and a Bluetooth® allow list.

Figure 3:
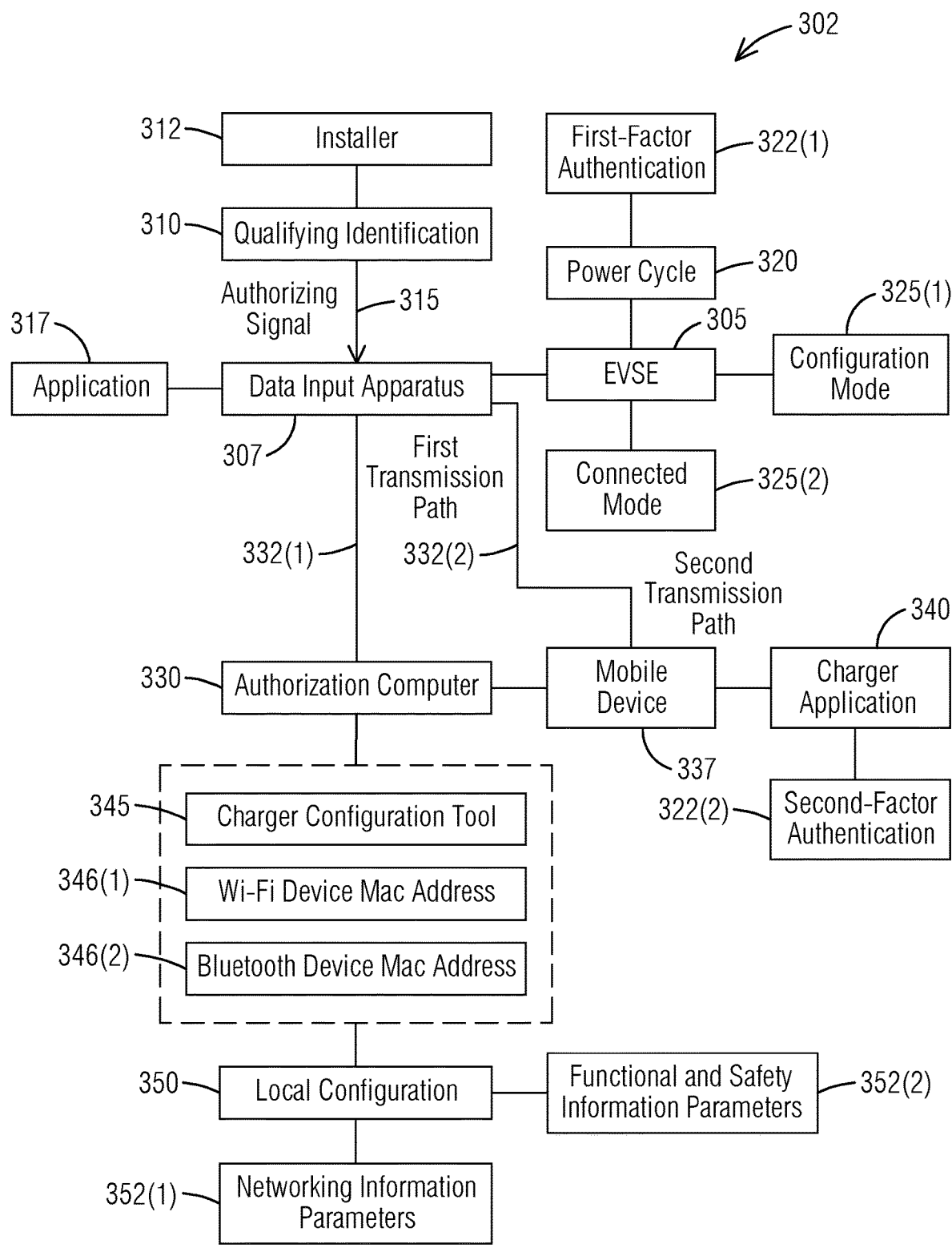
FIG. 3 illustrates a system for authorizing access to an offline Electric Vehicle Supply Equipment (EVSE) via 2-factor authentication for an EVSE configuration in accordance with a third embodiment of the present invention.

Turning now to FIG. 3, it illustrates a system 302 for authorizing access to an offline Electric Vehicle Supply Equipment (EVSE) 305 via 2-factor authentication for an EVSE configuration in accordance with a third embodiment of the present invention. The EVSE 305 have no network connectivity and is deployed in a location without network connectivity. The system 302 comprises a data input apparatus 307 for entering a qualifying identification 310 of an installer 312 and for entering an authorizing signal 315 by the installer 312 to login into an application 317 that shows the EVSE 305 that the installer 312 is authorized to configure the EVSE 305. The login initiates a power cycle 320 of the EVSE 305 in that the EVSE 305 is to be rebooted. The power cycle 320 in itself is a first-factor authentication 322(1). The power cycle 320 puts the EVSE 305 in a configuration mode 325(1). It is not possible for the installer 312 to login into the application 317 that shows the EVSE 305 that a person is authorized to configure the EVSE 305 or when that is not enough to authenticate the person.

The system 302 further comprises an authorization computer 330 connected through a first transmission path 332(1) to the data input apparatus 307. The authorization computer 330 includes a charger configuration tool 345 for configuration of the EVSE 305 such that the authorization computer 330 is identified by a Wi-Fi® device Mac address 346(1) or a Bluetooth® device Mac address 346(2) as a second-factor authentication 322(2).

The system 302 further comprises a mobile device 337 connected through a second transmission path 332(2) to the data input apparatus 307. The authorization computer 330 includes a charger application (APP) 340 for configuration of the EVSE 305 such that the mobile device 337 is identified by the Wi-Fi® device Mac address 346(1) or the Bluetooth® device Mac address 346(2) as a second-factor authentication 322(1).

In the system 302, a local configuration 350 is possible of networking information parameters 352(1) and functional and safety information parameters 352(2) based on the 2-factor authentication of a person configuring the EVSE 305. The functional and safety information parameters 352(2) include: an Open Charge Point Protocol (OCPP) server address, a Cloud server address, an Authentication mode (authenticated vs free), a Radio-frequency identification (RFID) allow list, a maximum current (future), and a Bluetooth® allow list.

Figure 4:
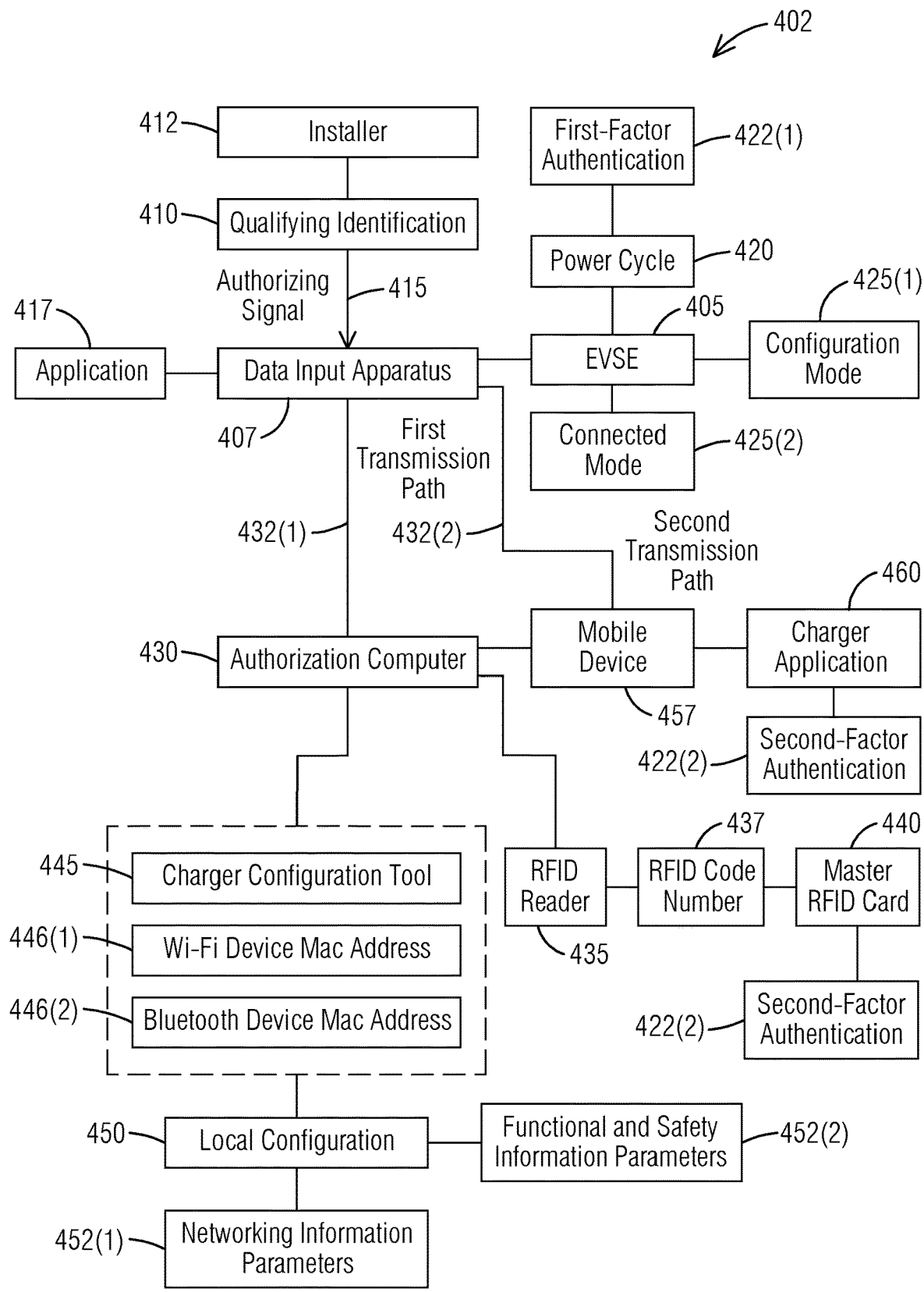
FIG. 4 illustrates a system for authorizing access to an offline Electric Vehicle Supply Equipment (EVSE) via 2-factor authentication for an EVSE configuration in accordance with a fourth embodiment of the present invention.

FIG. 4 illustrates a system 402 for authorizing access to an offline Electric Vehicle Supply Equipment (EVSE) 405 via 2-factor authentication for an EVSE configuration in accordance with a fourth embodiment of the present invention. The EVSE 405 have no network connectivity and is deployed in a location without network connectivity. The system 402 comprises a data input apparatus 407 for entering a qualifying identification 410 of an installer 412 and for entering an authorizing signal 415 by the installer 412 to login into an application 417 that shows the EVSE 405 that the installer 412 is authorized to configure the EVSE 405. The login initiates a power cycle 420 of the EVSE 405 in that the EVSE 405 is to be rebooted. The power cycle 420 in itself is a first-factor authentication 422(1). The power cycle 420 puts the EVSE 405 in a configuration mode 425(1). It is not possible for the installer 412 to login into the application 417 that shows the EVSE 405 that a person is authorized to configure the EVSE 405 or when that is not enough to authenticate the person.

The system 402 further comprises a Radio-frequency identification (RFID) reader 435 to read a RFID code number 437 from a master RFID card 440 as a second-factor authentication 422(2) in order to authorize configuration of the EVSE 405. The master RFID card 440 is assigned to the EVSE 405 during manufacturing and serves as a proof that the installer 412 configuring the EVSE 405 is authorized to do so.

The system 402 further comprises an authorization computer 430 connected through a first transmission path 432(1) to the data input apparatus 407. The authorization computer 430 includes a charger configuration tool 445 for configuration of the EVSE 405 such that the authorization computer 430 is identified by a Wi-Fi® device Mac address 446(1) or a Bluetooth® device Mac address 446(2) as a second-factor authentication 422(2).

The system 402 further comprises a mobile device 457 connected through a second transmission path 432(2) to the data input apparatus 407. The authorization computer 430 includes a charger application (APP) 460 for configuration of the EVSE 405 such that the mobile device 457 is identified by the Wi-Fi® device Mac address 446(1) or the Bluetooth® device Mac address 446(2) as a second-factor authentication 422(1).

In the system 402, a local configuration 450 is possible of networking information parameters 452(1) and functional and safety information parameters 452(2) based on the 2-factor authentication of a person configuring the EVSE 405. The functional and safety information parameters 452(2) include: an Open Charge Point Protocol (OCPP) server address, a Cloud server address, an Authentication mode (authenticated vs free), a Radio-frequency identification (RFID) allow list, a maximum current (future), and a Bluetooth® allow list.

While a design based on a power cycle being a first-factor authentication of a 2-factor authentication is described here a range of one or more other first-factor authentications are also contemplated by the present invention. For example, other first-factor authentications may be implemented based on one or more features presented above without deviating from the spirit of the present invention.

The techniques described herein can be particularly useful for 2-factor authentication. While particular embodiments are described in terms of 2-factor authentication, the techniques described herein are not limited to such 2-factor authentication but can also be used with other multi-factor authentication.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A method for authorizing access to an offline Electric Vehicle Supply Equipment (EVSE) via 2-factor authentication for an EVSE configuration, the method comprising:

entering a qualifying identification of an installer and entering an authorizing signal by the installer to login into an application that shows the EVSE that the installer is authorized to configure the EVSE, wherein the login is configured to initiate a power cycle of the EVSE in that the EVSE is to be rebooted, wherein the power cycle in itself is a first-factor authentication, wherein the power cycle puts the EVSE in a configuration mode; and connecting an authorization computer connected through a first transmission path for establishing an authorization signal and for verifying a received authorization signal for a user to connect the EVSE to Internet which puts the EVSE in a connected mode, and checking user rights of the user as a second-factor authentication by a charger configuration tool or a charger application (APP) or a configuration software.

2. The method of claim 1,
performing a local configuration of networking information parameters and functional and safety information parameters based on the 2-factor authentication of a person configuring the EVSE.

3. The method of claim 2,
wherein the functional and safety information parameters include: an Open Charge Point Protocol (OCPP) server address, a Cloud server address, an Authentication mode (authenticated vs free), a Radio-frequency identification (RFID) allow list, a maximum current (future), and a Bluetooth® allow list.

4. The method of claim 1,
wherein the EVSE is without network connectivity and is deployed in a location without network connectivity.

5. A method for authorizing access to an offline Electric Vehicle Supply Equipment (EVSE) via 2-factor authentication for an EVSE configuration, the method comprising:
entering a qualifying identification of an installer and entering an authorizing signal by the installer to login into an application that shows the EVSE that the installer is authorized to configure the EVSE,
wherein the login is configured to initiate a power cycle of the EVSE in that the EVSE is to be rebooted,
wherein the power cycle in itself is a first-factor authentication, and
wherein the power cycle puts the EVSE in a configuration mode; and
reading, by a radio-frequency identification (RFID) reader, a RFID code number from a master RFID card as a second-factor authentication in order to authorize configuration of the EVSE, wherein the master RFID card is assigned to the EVSE during manufacturing and serves as a proof that the installer is authorized to configure the EVSE.

6. The method of claim 5,
performing a local configuration of networking information parameters and functional and safety information parameters based on the 2-factor authentication of a person configuring the EVSE.

7. The method of claim 6,
wherein the functional and safety information parameters include: an Open Charge Point Protocol (OCPP) server address, a Cloud server address, an Authentication mode (authenticated vs free), a Radio-frequency identification (RFID) allow list, a maximum current (future), and a Bluetooth® allow list.

8. The method of claim 5,
wherein the EVSE is without network connectivity and is deployed in a location without network connectivity.

9. A method for authorizing access to an offline Electric Vehicle Supply Equipment (EVSE) via 2-factor authentication for an EVSE configuration, the method comprising:
entering a qualifying identification of an installer and entering an authorizing signal by the installer to login into an application that shows the EVSE that the installer is authorized to configure the EVSE,
wherein the login is configured to initiate a power cycle of the EVSE in that the EVSE is to be rebooted,
wherein the power cycle in itself is a first-factor authentication, and
wherein the power cycle puts the EVSE in a configuration mode; and
connecting an authorization computer through a first transmission path, wherein the authorization computer includes a charger configuration tool for configuration of the EVSE such that the authorization computer is identified by a Wi-Fi® device Mac address or a Bluetooth® device Mac address as a second-factor authentication, or
connecting a mobile device connected through a second transmission path, wherein the authorization computer includes a charger application (APP) for configuration of the EVSE such that the mobile device is identified by a Wi-Fi® device Mac address or a Bluetooth® device Mac address as a second-factor authentication.

10. The method of claim 9,
performing a local configuration of networking information parameters and functional and safety information parameters based on the 2-factor authentication of a person configuring the EVSE.

11. The method of claim 10,
wherein the functional and safety information parameters include: an Open Charge Point Protocol (OCPP) server address, a Cloud server address, an Authentication mode (authenticated vs free), a Radio-frequency identification (RFID) allow list, a maximum current (future), and a Bluetooth® allow list.

12. The method of claim 9,
wherein the EVSE is without network connectivity and is deployed in a location without network connectivity.

13. A method for authorizing access to an offline Electric Vehicle Supply Equipment (EVSE) via 2-factor authentication for an EVSE configuration, the method comprising:
entering a qualifying identification of an installer and entering an authorizing signal by the installer to login into an application that shows the EVSE that the installer is authorized to configure the EVSE,
wherein the login is configured to initiate a power cycle of the EVSE in that the EVSE is to be rebooted,
wherein the power cycle in itself is a first-factor authentication, and
wherein the power cycle puts the EVSE in a configuration mode;
reading, by a radio-frequency identification (RFID) reader, a RFID code number from a master RFID card as a second-factor authentication in order to authorize configuration of the EVSE, wherein the master RFID card is assigned to the EVSE during manufacturing and serves as a proof that the installer configuring the EVSE is authorized to do so; and
connecting an authorization computer through a first transmission, wherein the authorization computer includes a charger configuration tool for configuration of the EVSE such that the authorization computer is identified by a Wi-Fi® device Mac address or a Bluetooth® device Mac address as the second-factor authentication, or
connecting a mobile device through a second transmission path, wherein the authorization computer includes a charger application (APP) for configuration of the EVSE such that the mobile device is identified by a Wi-Fi® device Mac address or a Bluetooth® device Mac address as the second-factor authentication.

14. The method of claim 13,
performing a local configuration of networking information parameters and functional and safety information parameters based on the 2-factor authentication of a person configuring the EVSE.

15. The method of claim 14,
wherein the functional and safety information parameters include: an Open Charge Point Protocol (OCPP) server address, a Cloud server address, an Authentication mode (authenticated vs free), a Radio-frequency identification (RFID) allow list, a maximum current (future), and a Bluetooth® allow list.

16. The method of claim 13,
wherein the EVSE is without network connectivity and is deployed in a location without network connectivity.

* * * * *